(12) United States Patent
Goetzelmann et al.

(10) Patent No.: US 12,370,736 B2
(45) Date of Patent: Jul. 29, 2025

(54) METHOD FOR PRODUCING COMPONENTS OF AN OUTER SKIN OF A VEHICLE

(71) Applicant: Magna Exteriors GmbH, Sailauf (DE)

(72) Inventors: Johannes Goetzelmann, Altertheim (DE); Klaus Muenker, Griesstaett (DE)

(73) Assignee: Magna Exteriors GmbH, Sailauf (DE)

( * ) Notice: Subject to any disclaimer, the term of this patent is extended or adjusted under 35 U.S.C. 154(b) by 697 days.

(21) Appl. No.: 17/716,157

(22) Filed: Apr. 8, 2022

(65) Prior Publication Data

US 2022/0324155 A1    Oct. 13, 2022

(30) Foreign Application Priority Data

Apr. 12, 2021   (DE) .................... 10 2021 203 582.5

(51) Int. Cl.
| | |
|---|---|
| B29C 51/14 | (2006.01) |
| B29C 45/00 | (2006.01) |
| B29C 45/14 | (2006.01) |
| B29C 65/00 | (2006.01) |
| B29C 65/48 | (2006.01) |
| B29K 69/00 | (2006.01) |

(Continued)

(52) U.S. Cl.
CPC .......... *B29C 51/14* (2013.01); *B29C 45/0053* (2013.01); *B29C 45/14819* (2013.01); *B29C 65/48* (2013.01); *B29C 66/47* (2013.01); *B29C 2793/009* (2013.01); *B29C 2795/002* (2013.01); *B29K 2069/00* (2013.01); *B29K 2705/00* (2013.01); *B29K 2995/002* (2013.01); *B29K 2995/0026* (2013.01); *B29L 2031/30* (2013.01)

(58) Field of Classification Search
None
See application file for complete search history.

(56) References Cited

U.S. PATENT DOCUMENTS

| | | |
|---|---|---|
| 6,241,153 B1 | 6/2001 | Tiffany, III |
| 2005/0168374 A1 | 8/2005 | Kamiya et al. |

(Continued)

FOREIGN PATENT DOCUMENTS

| | | |
|---|---|---|
| CN | 109648781 A | 4/2019 |
| DE | 60210178 T2 | 1/2007 |

(Continued)

OTHER PUBLICATIONS

The Automotive Body (vol. I; Components Design); by Lorenzo Morello et al., 2011, Springer Netherlands; Springer Science & Business Media—no further English abstract is available.

*Primary Examiner* — Barbara J Musser
(74) *Attorney, Agent, or Firm* — Dickinson Wright PLLC

(57) ABSTRACT

A method for producing components of an outer skin of a vehicle with a film, which is back-molded at least from one a front side or rear side with clear plastics material, includes subjecting the film to a thermoforming process in order to generate the desired three-dimensional form. The film is subjected to further steps for preparation of the back-molding, including providing the film at least partially with a color layer. The film includes regions, through which other colors are intended to show through and be visible from the front side, or electromagnetic waves are intended to pass. The film may be punched-out in the regions to define punched-out portion in which components are inserted. The components are attached to the film by adhesive and/or overmolding on the rear side.

18 Claims, 2 Drawing Sheets

(51) Int. Cl.
  *B29K 705/00*   (2006.01)
  *B29L 31/30*    (2006.01)

(56) References Cited

U.S. PATENT DOCUMENTS

2007/0210979 A1    9/2007  Shingyoji
2017/0190083 A1    7/2017  Zhou et al.

FOREIGN PATENT DOCUMENTS

DE    102006046436 B3    4/2008
DE    102009017698 A1    10/2009

METHOD FOR PRODUCING COMPONENTS OF AN OUTER SKIN OF A VEHICLE

CROSS-REFERENCE TO RELATED APPLICATIONS

This application claims priority to DE 102021203582.5, filed Apr. 12, 2021. The entire disclosure of the above application is incorporated herein by reference.

FIELD

The present disclosure relates to a method for producing components of an outer skin of a vehicle with a film using a thermoforming process.

BACKGROUND

This section provides information related to the present disclosure which is not necessarily prior art.

Owing to the increasing usage of electric vehicles, the requirements with regard to the front panel of the vehicle are changing, because radiator inlet openings are not required to the same extent as for internal combustion engines.

Front panels in electric vehicles are increasingly including closed radiator grilles, which results in better aerodynamics of the vehicle along with the simultaneously lower demand for cooling air.

Front panels are often manufactured from transparent polycarbonate and provided with suitable decorative elements or functional elements.

Front panels may be produced in a 2K injection-moulding process. The rear side, that is to say the vehicle inner side of the panel, is subsequently painted, it being necessary for the front side, that is to say the outer side of the vehicle, to be protected prior to painting. To this end, the front side is masked.

In order to produce structures, embossed geometries of the front panel are exposed using a laser. Subsequently, the inner side is coated by a physical vapor deposition process, PVD, in order to obtain a chrome effect with simultaneous radar and light transparency.

The front side obtains a hardcoat coating.

This method requires multiple successive processes, which all have individual reject rates and therefore increase the overall reject rate and the component costs.

DE 10 2006 046 436 B3 discloses a cover element which is a film that can be thermoformed and painted. This film is overmolded with plastic, specifically on both sides. In this case, the film has been metallized, it being stated in paragraph 15 that this layer has to be so thin that it is transparent for electromagnetic waves, such as radar signals. There is therefore expressly no provision for any regions with punched-out portions. Components provided in openings also do not show through.

DE 602 10 178 T2 discloses the production of films for a mobile phone. The film is perforated so that buttons etc. can pass through the film. This reference does not relate to the showing through of components of different colour or of different electromagnetic transmitters.

U.S. Pat. No. 6,241,153 B1 discloses an adhesively bonded sensor which is installed in a smart card.

SUMMARY

This section provides a general summary of the disclosure, and is not a comprehensive disclosure of its full scope or all of its features.

The present disclosure provides a method for producing components of an outer skin of a vehicle with a film, which is back-moulded at least from one side with clear plastics material, wherein the film is subjected to a thermoforming process in order to generate the desired three-dimensional form, and the film is subjected to further steps for preparation of the back-moulding, wherein the film is at least partially provided with a colour layer, and the film comprises regions through which other colours are intended to show or electromagnetic waves are intended to pass.

It is an object of the invention to employ a method which provides an equivalent visual appearance while simultaneously reducing the number of process steps and obtaining the illumination and sensor integration function.

The object is achieved by a method for producing components of an outer skin of a vehicle with a film, which is back-moulded at least from one side with clear plastics material, wherein the film is subjected to a thermoforming process in order to generate the desired three-dimensional form, and the film is subjected to further steps for preparation of the back-moulding, wherein the film is at least partially provided with a colour layer, and the film comprises regions through which other colours are intended to show or electromagnetic waves are intended to pass.

In this case, the electromagnetic waves may lie in the visible range and may include an illumination device. Sensor signals, that is to say for example radar signals, are also intended to be included as one of the types of electromagnetic wave intended to pass through the film.

In this context, colours are also understood to include metallic coatings such as, for example, chrome-plating.

The method according to the invention reduces the number of processes, and thus has advantages with respect to the cycle times of the production operation. It is possible to integrate various different design ideas in a simple manner.

The film is provided with a color layer prior to or after the thermoforming operation. This increases the flexibility of the production process.

In one aspect, the film is a metallized film which reflects in a manner similar to chromium.

In one aspect, the regions are prepared by punched-out portions from the film.

As a result, cutouts, into which components are later inserted, are produced that have a colored and/or luminous visual appearance towards the outside.

These components are produced separately and have the desired colored or metal surfaces. In this case, the components may have multiple light functions or sensor functions.

If a metallized, for example chromium-coated, film is used, the regions are formed by selective printing of the film with color.

The components are connected to the film in the regions.

In one aspect, glass-clear adhesive is used to connect the components to the film, at least in the regions.

Alternatively, the components are connected to the film by overmolding with a clear plastics material.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
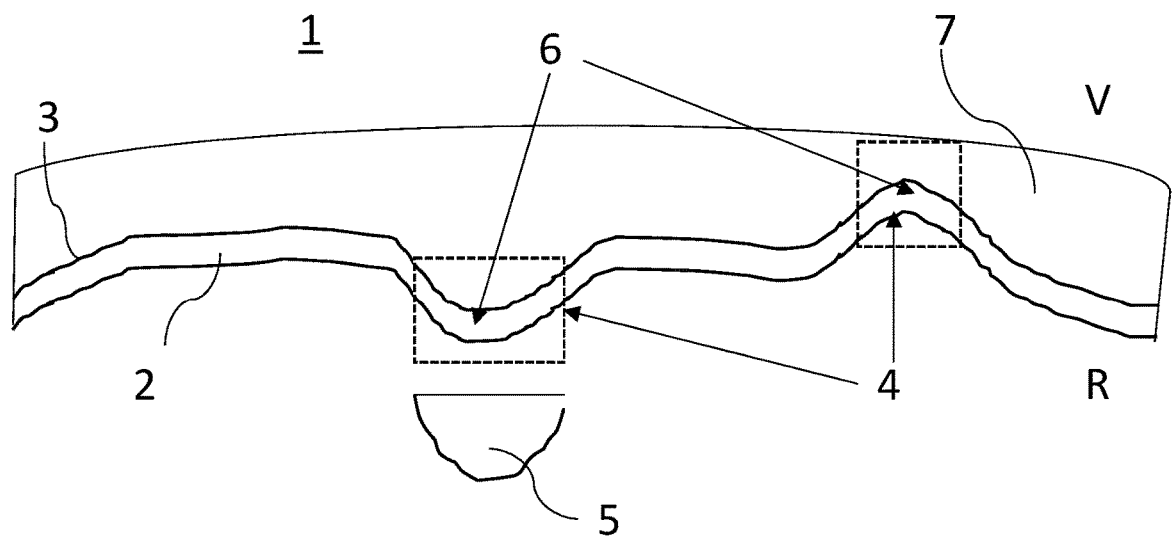
FIG. 1 shows a sectional illustration of a construction in a first embodiment prior to the mounting of components.

With initial reference to FIG. 1, in order to improve the production method for a front panel or another component 1 of an outer skin of a vehicle, use is made of a method which operates with a back-molded film.

A film 2, which is suitably prepared and overmolded with a glass-clear PC material, serves as a basis. In one embodiment, this film layer may be of partially transparent coloring, and in another embodiment, may be formed from PMMA.

In a first embodiment according to FIGS. 1 and 2, the film 2 is initially thermoformed to produce a predefined form or shape and is subsequently painted with a color, for example the vehicle color to define a color layer. In this case, the color layer 3 is applied to the side of the film 2 that is to be overmolded later on.

The painted, pre-formed film 2 includes regions 4 which may have specially embossed geometries, such as indentations or elevations. These geometries are intended to be subsequently illuminated in another color or in a chrome variant. To this end, the regions 4 in the film 2 may be punched out.

Initially, the prepared colored film 2 with its punched-out portion 6 is overmolded with a glass-clear PC layer 7, in which the specially embossed geometries are then present.

Figure 2:
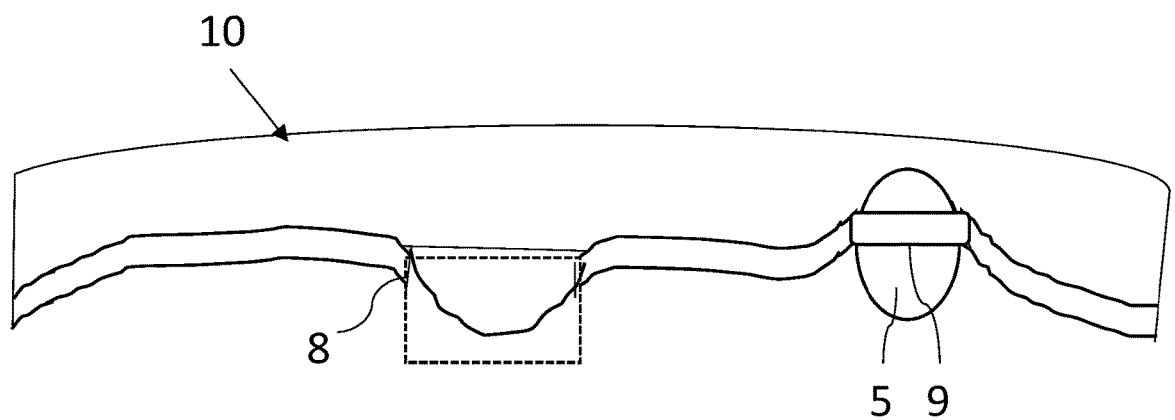
FIG. 2 shows a sectional illustration of a construction in a first embodiment after the mounting of components.

Components 5, shown in both FIGS. 1 and 2, which are either functional elements or decorative elements, are adapted to the geometrical indentations or elevations of the regions 4 and are produced as separate components 5. The components 5 can be embodied with different colors, or as a chrome-plated or PVD-coated component and/or as a light guide. The visual appearance of the regions 4 shows through the punching openings of the film 2 and of the glass-clear injection-molded encapsulation of the PC layer 7, and can be seen from the outside, that is to say from the front side V.

As shown in FIG. 2, the overmolded colored film 2, having the PC layer 7 thereon, is then coated from the rear side R with a visually transparent adhesive 8, at least in the regions of the punched-out portions 6, and the components 5 are fitted. Should relatively large or relatively complex components 5 be involved, a holder of a separate retaining frame 9 may also be connected from the rear side to the component 5 and the adhesive 8.

This use of the frame 9 may make it easier to assemble active components, which then only have to be fitted in the retaining frames 9 after the production process has concluded.

In an alternative embodiment, the film 2 may be produced from a chromium film. A screen printing process is used to print the chromium film with color, the vehicle color or with a contrast color, such that the regions 4 in which chromium is intended to be visible are left blank relative to the printing of the color on the film. In this embodiment, the punched-out portions do not need to be provided.

The film 2 can readily be provided with the color layer 3 prior to or after the thermoforming operation. For example, the film 2 may be painted with the color layer in a first form and prior to being formed and shaped into the thermoformed condition, schematically shown in FIG. 1. Or, the film may be formed and shaped into the thermoformed condition schematically shown in FIG. 1, and the color layer 3 may be painted on the shaped film 2. Once the film 2 is shaped along with the color layer 3 in either of the above methods, the PC layer 7 may be applied to arrive at the condition shown schematically in FIG. 1.

Figure 3:
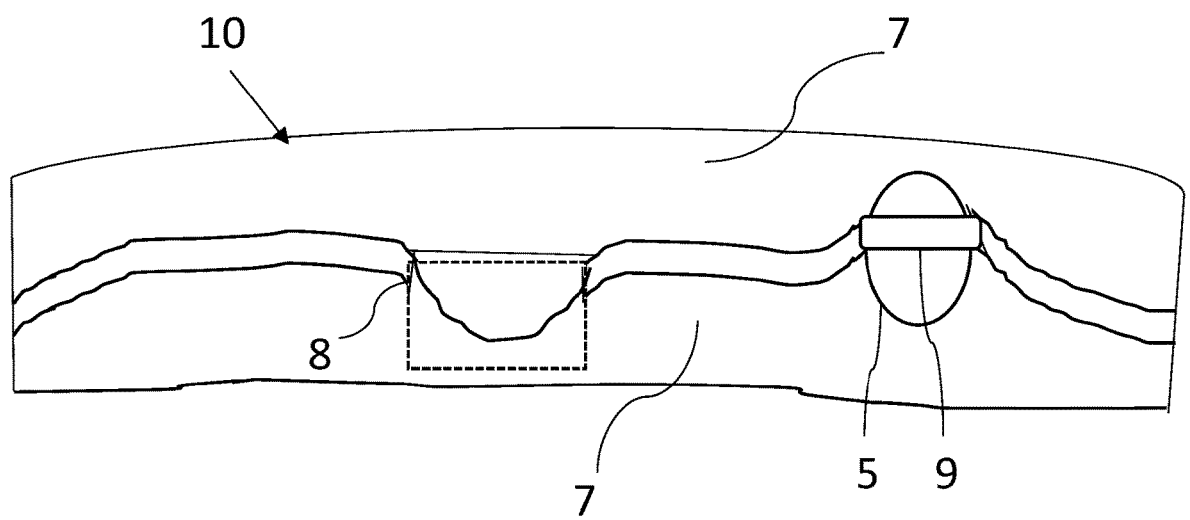
FIG. 3 shows an alternative embodiment after the mounting of components.

In a further alternative embodiment according to FIG. 3, the separately produced components 5 are not bonded, but rather are inserted into an injection-molding tool and overmolded with clear PC material 7 on the rear side R (in addition to the layer 7 on the front side V) together with the film 2, with the result that the components 5 are connected to the film 2 via the overmolding.

If the film 2 is back-molded from the rear as well as from the rear side R, the color layer 3 can also be applied to the side of the film 2 which is situated in the direction of the rear side. Thus, the color layer 3 may be applied to both sides, with the PC layer 7 covering the color layer 3 on both front and rear sides.

In all variants with a visible side composed of polycarbonate, include those of FIGS. 2 and 3, coating is effected from the outside with a hardcoat 10 applied to the PC layer 7, which protects the PC layer 7 against UV and scratching.

The description and specific examples provided above and illustrated in the drawings are intended for purposes of illustration and are not intended to limit the scope of the invention as set forth in the appended claims.

REFERENCE SIGNS

1 Component of an outer skin of a vehicle
2 Film
3 Color layer
4 Regions
5 Components
6 Punched-out portions
7 PC layer
8 Adhesive
9 Retaining frame
10 Hardcoat

What is claimed is:

1. A method for producing an outer skin of a vehicle, the method comprising:
    thermoforming a film and generating a predetermined three-dimensional form having a front side and a rear side,
    disposing a color layer, at least partially, on the film,
    disposing a molded clear layer of plastics material over the film, wherein the molded clear layer of plastics material covers the front side of the film;
    wherein the film comprises regions through which other colors are intended to show or electromagnetic waves are intended to pass,
    punching out portions from the film corresponding to the regions, to define punched-out portions,
    inserting components having a colored or luminous visual appearance towards the outside into the punched-out portions,
    wherein the components disposed in the punched-out portions of the film show and through the clear layer of plastics material, wherein the clear layer of plastics material is a glass-clear injection-molded covering of the film, and wherein the components can be seen from the front side;
    wherein the film includes specially embossed geometries including indentations and/or elevations formed in the predetermined three-dimensional form, wherein the specially embossed geometries correspond to the regions of the punched-out portions;

wherein the specially embossed geometries are present in the injection-molded covering on the front side.

2. The method according to claim 1, wherein the color layer is disposed on the film prior to or after the thermoforming of the film.

3. The method according to claim 1, wherein the film is a metallized film.

4. The method according to claim 3, wherein the regions are defined and marked by selective printing of the film with color.

5. The method according to claim 1, wherein the components are connected to the film in the regions.

6. The method according to claim 1, wherein a glass-clear adhesive is used to connect the components to the film, at least in the regions.

7. The method according to claim 1, wherein the components are connected to the film by overmolding the rear side of the film with a clear plastics material in a PC or PMMA layer.

8. The method according to claim 1, wherein the components are connected to the film by overmolding the rear side of the film with a clear plastics material of transparent coloring.

9. The method according to claim 1, wherein selected punched-out portions from the film are used as openings for electromagnetic waves of from sensors.

10. A method of manufacturing a vehicle skin, the method comprising:

thermoforming a film into a predetermined shape, the film having an outer side and an inner side;

disposing a color layer on the outer side of the film;

after disposing the color layer on the outer side of the film, overmolding a PC layer on the color layer and covering the outer side of the film;

punching out a portion of the film on the inner side and defining a punched-out portion;

inserting a component into the punched-out portion;

connecting the component to the film;

wherein the component shows through the PC layer and is visible from the outer side;

further comprising inserting a retaining frame into the punched out portion.

11. The method of claim 10, wherein the color layer is disposed on the film after thermoforming.

12. The method of claim 10, wherein the color layer is disposed on the film prior to thermoforming.

13. The method of claim 10, wherein the components are attached to the film via an adhesive.

14. The method of claim 10, further comprising overmolding the components on the inner side after inserting the components into the punched-out portion.

15. The method of claim 10 wherein the film is a metallic film.

16. The method of claim 15, wherein the color layer is not disposed over portions of the film, such that the portions of the film are uncovered by the color layer, wherein a metallic color of the metallic film is visible through the portions of the color layer that are uncovered.

17. The method of claim 10, wherein the component is attached to the film via attachment to the retaining frame.

18. The method of claim 10, wherein the component has a profile corresponding to a geometry of a region of the film corresponding to a location of the punched-out portion.

* * * * *